United States Patent
Gupta et al.

(10) Patent No.: US 6,846,469 B1
(45) Date of Patent: Jan. 25, 2005

(54) METHOD FOR EXTENDING OPERATING LIFE OF A FIXED BED REACTOR

(75) Inventors: Ramesh Gupta, Berkeley Heights, NJ (US); Salvatore Joseph Rossetti, Bernardsville, NJ (US); David Charles Dankworth, Whitehouse Station, NJ (US); Jeffrey L. Kaufman, Kingwood, TX (US); David Lee Vannauker, Kingwood, TX (US); James Philip Bailor, Seabrook, TX (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 09/712,654

(22) Filed: Nov. 14, 2000

Related U.S. Application Data

(62) Division of application No. 09/351,348, filed on Jul. 13, 1999, now abandoned.

(51) Int. Cl.[7] .............................................. B01J 35/02
(52) U.S. Cl. ...................... 422/211; 422/171; 422/176; 422/177; 422/191; 422/192; 422/193; 422/195; 422/213; 422/217; 422/220
(58) Field of Search ................................. 422/171, 176, 422/177, 191, 192, 193, 195, 211, 213, 217, 220; 48/197 R, 198.6, 198.7; 423/650, 651

(56) References Cited

U.S. PATENT DOCUMENTS

| | | | |
|---|---|---|---|
| 3,469,950 A | * 9/1969 | Mackley | 422/220 |
| 3,509,043 A | 4/1970 | McMaster et al. | 208/213 |
| 3,524,731 A | * 8/1970 | Effron et al. | 422/220 |
| 3,607,000 A | * 9/1971 | Beal et al. | 423/659 |
| 3,888,633 A | 6/1975 | Grosboll et al. | 23/284 |
| 3,992,282 A | 11/1976 | Grosboll et al. | 208/46 |
| 4,313,908 A | 2/1982 | Gupta | 422/111 |
| 4,330,505 A | 5/1982 | Gupta | 422/217 |
| 4,380,529 A | 4/1983 | Gupta | 422/220 |
| 4,385,033 A | 5/1983 | Gupta | 422/217 |
| 4,904,456 A | 2/1990 | Anderson | 422/220 |
| 5,160,513 A | * 11/1992 | Koves | 95/90 |
| 5,670,116 A | 9/1997 | Gupta et al. | 422/191 |

\* cited by examiner

Primary Examiner—Jerry D. Johnson
(74) Attorney, Agent, or Firm—Malcolm D. Keen

(57) ABSTRACT

A method for extending the operating life of a fixed bed reactor for reacting a feedstock in which a feedstock is contacted with a fixed bed of catalytic material contained in the reactor.

9 Claims, 1 Drawing Sheet

Figure
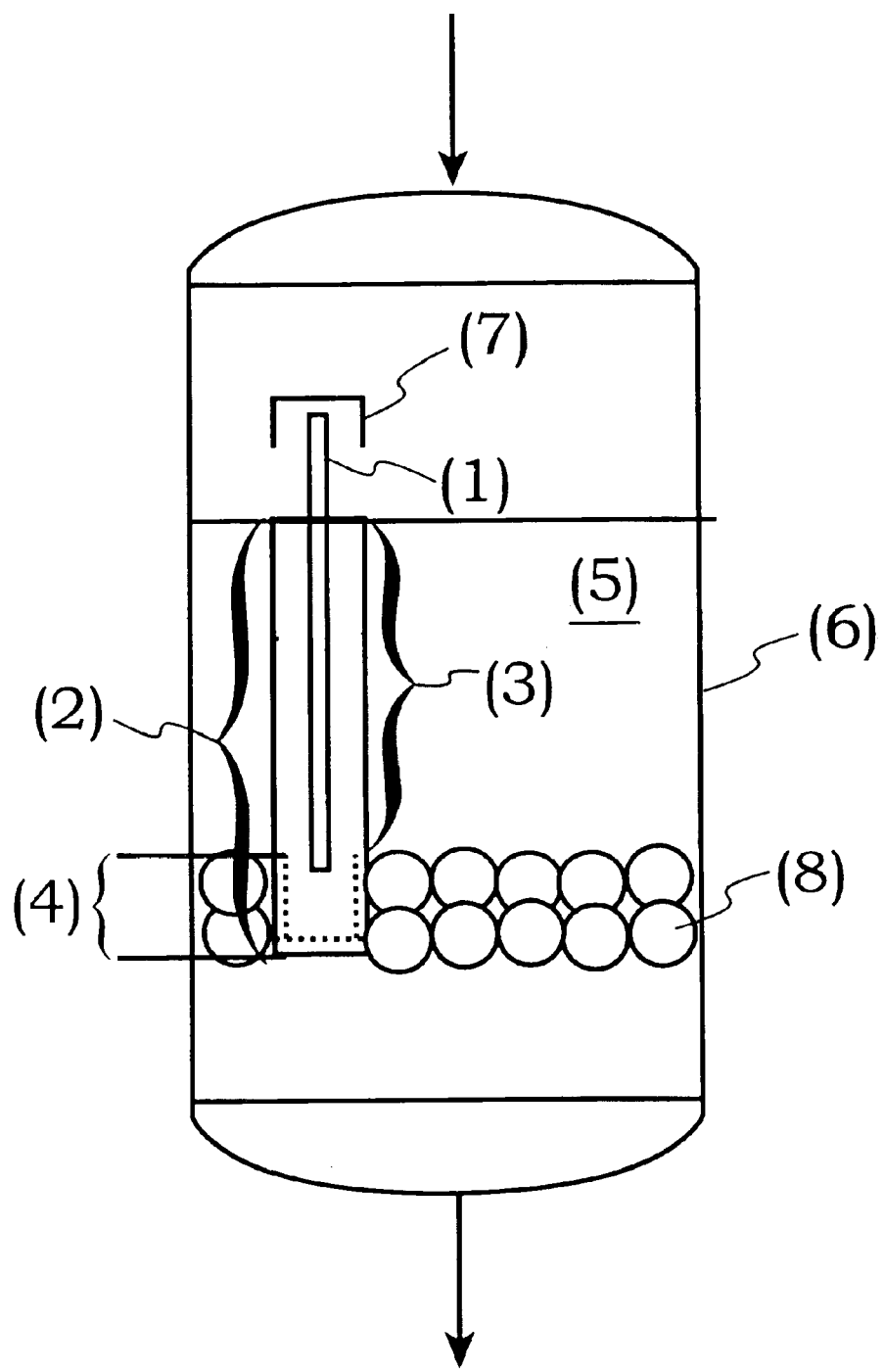

METHOD FOR EXTENDING OPERATING LIFE OF A FIXED BED REACTOR

This application is a divisional of application Ser. No. 09/351,648, filed 13 Jul. 1999, now abandoned.

FIELD OF THE INVENTION

An embodiment of the instant invention is directed to a reactor having bypass apparatus for extending the operating life of the reactor.

BACKGROUND OF THE INVENTION

In the normal operation of fixed bed chemical and oil refining reactors, the top of the catalyst bed often becomes fouled or plugged by the deposition of organometallic compounds, polymeric and carbonaceous materials and organic and inorganic particulates. The plugging of the catalyst bed is undesirable since the resultant increase in pressure drop necessitates costly shutdowns or throughput reduction and requires time consuming repairs and maintenance.

In an effort to overcome this problem, many schemes have been devised, where each reactor is equipped with more than one catalyst bed and a plugged bed is bypassed to extend the operating life of the reactor (see for example, U.S. Pat. Nos. 3,509,043; 4,313,908; and 5,670,116). The shortcoming of such teachings is that they require an auxiliary bypassable bed. For example, the above teachings are not applicable to reactors having only a single fixed bed of catalyst particles.

Additionally, schemes involving the use of what is commonly referred to in the art as trash baskets have been developed. In such schemes, as taught by U.S. Pat. Nos. 3,992,282 and 3,888,633, particulate impurities are removed from a fluid stream flowing into a fixed bed of catalyst by a hollow basket or scale traps that extends into the catalyst bed.

While the trash baskets described by the prior art tend to remove particulates contained in the fluid streams being passed through the reactor, they have only a small effect in minimizing pressure drop buildup due to fouling. The trash basket walls, usually made from screen mesh material, get fouled and plugged with particulates within a short period of time. Thus, the flow passage of the fluid streams is occluded and the pressure drop begins to rise, though at a somewhat slower rate than if the baskets were not used. Very often, it is desirable to keep these reactors on stream without significant pressure drop buildup for a long period of time lasting several years. Thus, the trash baskets do not provide adequate protection against pressure drop buildup, and an alternate method is needed to extend the run length of these reactors. What is needed in the art is a method which allows accumulation of the foulant particulates at the bed top while at the same time bypasses the reactants across this foulant particulate layer and distributes them to the catalyst bed underneath without significant pressure drop.

SUMMARY OF THE INVENTION

An embodiment of the invention is directed to a reactor for reacting a feedstock, said reactor comprising, a fixed catalyst bed for reaction of said feedstock, said reactor containing a bypass apparatus disposed within said fixed catalyst bed, said bypass apparatus being aligned with the direction of flow of said feedstock, and wherein said bypass apparatus comprise a cage member comprising a first elongated hollow member having a top wall, side walls and a bottom wall said cage member having openings therein, and a second hollow elongated member for passing said feedstock therethrough, said second hollow elongated member being disposed within and protruding through said top wall of said cage member and wherein said second elongated member extends above said catalyst bed through said cage member.

A further embodiment of the invention is directed to a method for extending the operating life of a fixed bed reactor for reacting a feedstock in which a feedstock is contacted with a fixed bed of catalytic material contained in said reactor said fixed bed of catalytic material having a top and bottom layer and wherein the pressure drop across said top layer of said fixed bed of catalyst material increases during reaction of said feedstock due to fouling of said top layer of said fixed bed of catalytic material, comprising the sequential steps of (a) introducing said hydrocarbon feedstock into said fixed bed of catalytic material, (b) as said top layer of said fixed bed of catalytic material fouls, bypassing an increasing amount of said feedstock to said bottom layer of said fixed bed of catalytic material.

BRIEF DESCRIPTION OF THE FIGURES

The FIGURE depicts a fouling tolerant fixed bed reactor according to an embodiment of the present invention.

DETAILED DESCRIPTION OF THE INVENTION

An embodiment of the present invention finds particular applicability in connection with increasing the cycle life of a fixed bed of catalyst particles contained within a hydroprocessing reactor in which a hydrocarbon feedstock is processed during the carrying out of any one of a multitude of chemical reactions.

Such reactors are typically used for the conversion or treatment of hydrocarbon or chemical feedstocks in the presence of a vapor phase, such as hydrogen containing treat gas. Nonlimiting reactors for which the present invention can be utilized include those used for hydroconversion of heavy petroleum feedstocks to lower boiling products; the hydrocracking of distillate boiling range feedstocks; and hydrotreating of various petroleum feedstocks, such as light hydrocarbons, naphtha and distillate boiling range streams. More particularly, the reactors on which the present invention are practiced are those having one fixed bed reaction or catalyst bed. This invention is also applicable to reactors having more than one catalyst bed but in which only the top portion of any of the fouling prone beds is bypassed.

For example, the bypass apparatus utilized herein can be particularly beneficial in preventing the fouling of a fixed catalyst bed utilized for contacting, a stream of hydrocarbon feedstock with a conventional reforming or hydroprocessing catalyst. The bypass apparatus allows the feedstock to bypass the upper portion or layer of the catalyst bed once fouling occurs, enabling the bed to be run for substantially longer periods of time as compared to running without the bypass apparatus.

Existing units can easily be equipped with the bypass apparatus to enable them to run for longer periods of time.

In an embodiment of the present invention, the second hollow elongated member extends both above the catalyst bed and into the catalyst bed. The cage member can be either partially or fully embedded or buried in the bed such that the section having openings therein discharges and distributes the bypassed hydrocarbon feed to an elevation within the bed below the top fouling layer of the bed. Preferably, the cage is closed at the top except for where the first hollow elongated member extends therethrough. However, depending upon the application, the entire cage member may have openings therein, including in the top, sides, and bottom. A cage member having an enclosed top is depicted in the FIGURE with openings in the bottom and sidewalls of the lower portion of the cage member.

The second elongated member extends through the first hollow elongated cage member preferably terminating substantially at the portion having openings therein. This allows for distribution of the bypassed hydrocarbon feedstock through the openings in the cage member. However, the second elongated member may stop short of the openings, or extend to an area within the portion of the cage member having openings. Preferably, the bottom of the cage member will likewise be enclosed and only the sidewalls will have the openings in the lower portion of the cage member. Preferably, the openings in the cage member will begin at a depth in the bed below the top layer of the catalyst bed. If desired, for example, in a cage buried in a catalytic bed below the surface of the bed, the entire cage length can have openings therein. For example, in a catalyst bed where only the top surface of the bed becomes fouled, it would be desirable to bypass feedstock, just below the fouled surface.

Referring now to the FIGURE, there is illustrated a conventional catalytic reactor vessel (6) containing a fixed bed of catalyst particles (5). Shown is one bypass apparatus. However, the invention may comprise a plurality of bypass apparatus spaced over the catalyst bed. Furthermore, each individual bypass apparatus may extend into the catalyst bed to different depths.

An embodiment of the invention is directed to a fixed bed reactor 6 for reacting a feedstock. The reactor 6 comprises a fixed catalyst bed 5 and a bypass device positioned or disposed within the fixed catalyst bed 5. The bypass device comprises a first elongated hollow member (also referred to as a "cage member" or "cage") 2 having a top wall, side walls, a bottom wall and a plurality of apertures or openings disposed generally near a lower end or section of cage 2. The bypass device further comprises a second elongated hollow member 1 disposed within cage 2 and protruding or extending through the top wall of cage 2. The second elongated member 1 extends above the catalyst bed 5. The cage member 2 has an upper enclosed portion (top wall and upper portion of the side walls) 3 and a lower perforated portion (bottom wall and lower portion of side walls) 4. Optionally, the second hollow elongated member 1 may have a cap 7 over the end or portion of member 1 that extends above the catalyst bed 5. The FIGURE also shows an optional layer of inert material 8 disposed within the catalyst bed in which the bypassed material is distributed. The first and second elongated hollow members may be tubular members with the first elongated hollow member 1 positioned or disposed within the second elongated hollow member as shown in the FIGURE. In operation, the bypass tube receives a portion of the feedstock and directs it into the cage where it is discharged through the openings of the cage into the catalyst bed 5.

The bypass apparatus are inserted into the catalyst bed such that the cage is buried into the bed and the second hollow elongated member extends above the top surface of the bed. The cage member is perforated or is made from a material having openings and acts as a distributor for the hydrocarbon feed passing through the first hollow elongated member. The perforations may simply be made in the material of which the cage member is constructed, or a portion of the cage member can be constructed of a mesh type material. The area of the cage having openings therein is easily determinable by the skilled artisan. Only the sidewalls may have openings, or other areas of the cage member such as the top and bottom walls may likewise have openings therein. It is preferred that the size of the openings be large enough so that any small quantity of the particulates that are entrained in the bypassed flow are able to leave the cage and get distributed into the bed. Typically, the openings will range in size from about ⅛ inch (0.31 cm) to about ½ inch (1.25 cm) wide holes or slits. Alternatively, the openings can be sized small enough so that any bypassed foulant particulates will be retained within the cage. Bypass foulant particles are small particles contained in the hydrocarbon feed that are bypassed through the second hollow elongated member and which contribute to fouling of the catalyst bed. The bypass apparatus is embedded within the fixed catalyst bed such that the bottom of the cage is contained within the catalyst bed and the bypassed feed is distributed to the bottom layer of the catalyst bed. As used herein, the bottom layer of the catalyst bed is the area located beneath the area of the bed where substantial fouling during reactor operation occurs. This area is readily recognized by the skilled artisan. The top layer is the area above the bottom layer from the surface of the bed to a depth within the bed where substantial fouling occurs during reactor operations. Typically, the bottom of the catalyst bed is the portion of the bed located at least about 2.5 feet (75 cm) from the bed surface. However, depending upon the given operation, it is possible for the bottom layer of the bed to be located as little as about 6 inches (15 cm) from the catalyst bed surface. In such a case, only the top surface of the bed becomes fouled and will be bypassed. Again, the skilled artisan, taking into consideration the reactor and operation being performed, can determine the area of the catalyst bed to be bypassed.

One or more bypass apparatus may be utilized in any given bed. The cage member may extend through the catalyst bed to the same or different depths within the beds botton layer. The bypass apparatus of the present invention employs an elongated member or tube disposed within a substantially larger cross-section, perforated cage member, as show in the sole drawing of the application, to maintain the catalytic bed integrity and prevent the high exit velocities of the second elongated member from eroding the bed or causing the bed to slump, increase pressure drop, and deteriorate unit performance.

The reactor is operated by introducing the hydrocarbon feedstock to be reacted in the catalyst bed along with a suitable treat gas, if necessary, such as hydrogen. The feedstock can be a liquid, vapor, or mixture thereof. The reactor is operated at suitable conditions for the process being run. Such conditions are known in the art and are not modified by use of the bypass apparatus being utilized herein. The feedstream undergoes the desired chemical reaction as it moves through the catalyst bed. At the beginning, when the catalyst bed is clean and no foulants have deposited at the bed top, a majority of the flow will go through the catalyst bed instead of the bypass apparatus. This is because the bypass apparatus, particularly the second hollow elongated member, typically tubes, are sized to have a significantly high pressure drop relative to the clean bed, and the flow takes the path of least resistance. The second hollow elongated members are typically sized to provide a pressure drop of a factor of about 5 to about 50 times or of about 5 to about 25 higher relative to the clean bed. As the bed top fouls during operation, the resistance to flow through the bed increases, and an increasing fraction of the flow is bypassed through the bypass apparatus. Thus, the second hollow elongated members, typically tubes, are sized to have a flow resistance which is significantly higher than the flow resistance of the clean bed. As an example, the pressure drop through a clean (unfouled) top four feet layer of the catalyst bed would be typically 0.5 to 2 psi in a typical hydroprocessing reactor. Depending upon the operation, the bypass tubes will be sized to have a flow resistance of about 10 to 50 psi with total flow in the tubes. With this bypass arrangement, the pressure drop through the top four feet section of the bed will never exceed 50 psi. If the bypass tubes were not used, the pressure drop could be significantly higher than 50 psi upon fouling which would necessitate a reactor shutdown or throughput reduction.

The bypass apparatus can be any suitable structure that meets the criteria set forth herein. Preferably, both the second hollow elongated member and the cage member will be tubular in structure. The bypass apparatus will be constructed from material compatible with the operating conditions of the reactor. For example, suitable materials may include metals such as carbon steel and stainless steel ceramic materials, and other composite materials such as carbon fiber reinforced materials.

The second hollow elongated member, through which the feedstock is bypassed, may be of any diameter or width depending upon the amount and rate of material one wishes to bypass to the bottom, unfouled layer of the catalyst bed. Such diameters are easily determined by the skilled artisan. For example, the diameter of the second hollow elongated member can range from about 0.25 inch (0.625 cm) to about 12 inch (30 cm), more preferably from about 0.5 inch (1.25 cm) to about 6 inch (15 cm), and most preferably from about 0.5 inch (1.25 cm) to about 3 inch (7.5). The cage member, likewise, may be of any diameter. For example, from about 3 inch (7.5 cm) to about 20 inch (50 cm), more preferably from about 4 inch (10 cm) to about 12 inch (30 cm), and most preferably from about 4 inch to about 10 inch. The number of bypass apparatus utilized is dependent upon the size of the reactor and the flow rates in the reactor. As indicated earlier, the number of bypass apparatus is chosen such that the bypass apparatus offer higher resistance to flow than the clean beds, less resistance than a fouled bed. One or more bypass apparatus may be utilized. When determining the number and location of the bypass apparatus, the skilled artisan will take into consideration localized velocities, residence times, temperature distribution, etc. The number and location of the apparatus will be chosen such that the units performance is maintained.

The section of the cage member having perforations functions as a distributor for the bypassed feedstock into the catalyst bed through the second hollow elongated member. It is preferred that the area surrounding the cage perforations be packed with a layer of packing material of a size that will assist in the distribution of the bypassed feedstock through the catalyst bed. The packing material allows any particulates flowing into the bypass apparatus to be dispersed upon exiting the cage openings. The packing material could be any inert material such as alumina balls typically used to support catalyst in a fixed bed. The packing material could also be any other material or even catalyst particles. Catalyst particles, if chosen, will be of an appropriate size to distribute the feedstock being bypassed. Use of particles for distribution is merely optional and is not required. Typically, the particles will range in size from about ¼ inch (0.625 cm), up to about 3 (7.5 cm) to about 4 (10 cm) inches. In addition to alumina balls, several other packing materials that are typically used in packed towers could also be used.

In a preferred embodiment of the invention, the second hollow elongated member may have a device at the top to facilitate separation of particulates from the bypassed hydrocarbon feed. For example, a cap as is shown in the FIGURE could be used. The downward moving hydrocarbon feed from the reactor inlet is forced to change its direction by the cap so that the feed can move upward and then enter the bypass apparatus. While the flow direction of the feed is changed by the cap, the inertia of the particulates prevent these particulates from changing their flow direction These particulates separate out and accumulate at the bed top. Thus, a separation device allows the bypassing of a relatively particulate free feed to bypass the fouled top section of the bed, and fouling in the interior sections of the bed is minimized. While the separation cap would remove the large particulates, depending upon the sizes of the incoming particulates, some of the very small particulates may not get separated by the inertial separation. Very often, these very small particulates that have failed to separate are so small in size that they will pass through the catalyst bed without plugging it. If some of these very small particulates are unable to go through the catalyst bed, they will disperse in the layer of the inert packing that surrounds the cage perforations or openings. Thus, pressure drop buildup is minimized. In addition to a simple cap, other separation devices could also be used. Examples of these separation devices include small centrifugal separators or cyclones mounted on the top of each bypass tube.

What is claimed is:

1. A method for operating a fixed bed reactor having an operating life for reacting a feedstock said fixed bed reactor comprising a fixed catalyst bed having a top layer and a bottom layer, wherein during operation of said fixed bed reactor a feedstock flow passes through said fixed catalyst bed and a pressure drop across said top layer of said fixed catalyst bed increases during reaction of said feedstock due to fouling of said top layer of said fixed catalyst bed, the method comprising:

(a) placing a bypass apparatus within said fixed catalyst bed in substantial alignment with said feedstock flow through said fixed catalyst bed said bypass apparatus comprising, a cage member embedded in the catalyst bed comprising a first elongated hollow member having a top wall, side walls and a bottom wall, said cage member having openings therein, and a second hollow elongated member for bypassing an increasing amount of said feedstock through said second hollow elongated member into said cage member as said top layer of said fixed bed fouls to create a bypass flow, said second hollow elongated member protruding through said top wall of said cage member and wherein said second hollow elongated member extends above said fixed catalyst bed through said cage member, said second hollow elongated member being sized to regulate said bypass flow, said age member having a substantially larger cross-section than said second hollow elongated member so that said bypass flow exists from said cage member into said bottom layer of said fixed catalyst bed at an effectively reduced velocity, (b) introducing said feedstock into said fixed bed of catalyst material, wherein a majority of said feedstock will flow through said top layer of said fixed bed of catalytic material, and (c) as said top layer of said fixed bed of catalytic material fouls, bypassing said increasing amount of said feedstock to said bottom layer of said fixed bed of catalytic material thereby extending the operating life of said fixed bed reactor; wherein said second hollow elongated member is continuously open to said bypass flow, wherein said al least one fixed catalyst bed contains inert packing material and wherein said feedstock exiting the openings in the cage member enters directly the packing material.

2. The method of claim 1, wherein said feedstock is a hydrocarbon feedstock selected from the group consisting of liquid feed, vapor feed, and mixtures thereof.

3. A method for extending an operating life of a fixed catalyst bed reactor, the method comprising:

providing a reactor comprising at least one fixed catalyst bed;

establishing a feedstock flow through said at least one fixed catalyst bed partitioning said at lease one fixed catalyst bed in to a top layer and a bottom layer by placing a bypass apparatus within said at least one fixed catalyst bed in substantial alignment with said flow of said feedstock, said bypass apparatus comprising, a cage member embedded in the catalyst bed comprising a first elongated hollow member having a top wall, side walls and a bottom wall, said cage member having openings therein, and a second hollow elongated member for bypassing an increasing amount of said feedstock through said second hollow elongated member into said cage member as said top layer of said at least one catalyst fixed bed fouls to create a bypass flow, said second hollow elongated member protruding through said top wall of said cage member and wherein said second hollow elongated member extends above said at least one fixed catalyst bed through said cage member, said second hollow elongated member being sized to regulate said bypass flow of said feedstock into said cage member, said cage member having a substantially larger cross-section than said second hollow elongated member so that said bypass flow exits from said cage member into said bottom layer of said at least one fixed catalyst bed at an effectively reduced velocity, bypassing said increasing amount of said feedstock flow through said bypass apparatus to the bottom layer, as said top layer fouls;

wherein said second hollow elongated member is continuously opened to said bypass flow, wherein said al least one fixed catalyst bed contains inert packing material and wherein said feedstock exiting the openings in the cage member enters directly the packing material.

4. The method of claim 3, wherein said second hollow elongated member is a tubular member having a diameter from about 0.25 to 12 inches.

5. The method of claim 3, wherein said cage member is a tubular member having a diameter of about 3 to 20 inches.

6. The method of claim 3, wherein said second hollow elongated member has a pressure drop of about 5 to 50 times greater than that of said at least one fixed catalyst bed when said at least one fixed catalyst bed is a fresh catalyst bed.

7. The method of claim 3, wherein said bypass apparatus further comprises a separation device disposed above said second hollow elongated member.

8. The method of claim 3, in which the second hollow elongated member has at its top a separation device selected from the group consisting of caps, centrifugal separators and cyclones to separate particulates from the feedstock flowing into the second hollow member.

9. The method of claim 3, wherein said packing material comprises allumina balls.

* * * * *